Sept. 2, 1952     E. H. SMITH     2,609,281
FLASHBACK ARRESTOR Filed Sept. 25, 1948     5 Sheets-Sheet 1

INVENTOR.
ELMER H. SMITH
BY Paul, Paul + Moore
ATTORNEYS

Sept. 2, 1952 E. H. SMITH 2,609,281
FLASHBACK ARRESTOR
Filed Sept. 25, 1948 5 Sheets-Sheet 2

Fig. 2
Fig. 6

INVENTOR.
ELMER H. SMITH
BY Paul, Paul & Moore
ATTORNEYS

Sept. 2, 1952 E. H. SMITH 2,609,281
FLASHBACK ARRESTOR
Filed Sept. 25, 1948 5 Sheets-Sheet 3

INVENTOR.
ELMER H. SMITH
BY Paul, Paul & Moore
ATTORNEYS

Sept. 2, 1952 E. H. SMITH 2,609,281
FLASHBACK ARRESTOR
Filed Sept. 25, 1948 5 Sheets-Sheet 5

INVENTOR.
ELMER H. SMITH
BY Paul, Paul & Moore
ATTORNEYS

Patented Sept. 2, 1952

2,609,281

UNITED STATES PATENT OFFICE 2,609,281

FLASHBACK ARRESTER

Elmer H. Smith, Minneapolis, Minn., assignor to Smith Welding Equipment Corporation, Minneapolis, Minn., a corporation of Minnesota Application September 25, 1948, Serial No. 51,243

1 Claim. (Cl. 48—192)

This invention relates to a new and novel device for automatically preventing a flash back or reverse flow of a high pressure gas through a pipe line arranged to normally conduct a low pressure gas from a source of gas supply to a point of use to prevent the occurrence of an explosion of the gas supply means under such conditions.

The invention is particularly well suited for use in connection with oxygen-acetylene torches. It is well known that serious and costly explosions may sometimes occur when operating oxygen-acetylene torches, should the burning gases at the tip of the torch backfire and cause a reverse flow of high pressure gas through the torch and gas supply pipe, particularly if such high pressure gas should reach the gas supply tank or generator.

To afford a clearer understanding of the present invention, particularly as applied to the handling of oxygen-acetylene fuel gases, such as are employed in cutting and welding torches, it may be well to briefly define the actions of certain gases such as acetylene, when an explosion occurs during the operation of an oxygen-acetylene torch, and why such explosions may occur at the usual gas supply tank or generator, even though such apparatus may be stationed a considerable distance from the place where the torch is being used; and what may cause such an explosion.

As an illustration, if a pipeline is utilized for conducting pure acetylene gas, under low pressure, usually ten pounds, to a torch located some distance from the gas supply tank or generator, and a backfire should occur at the torch tip, the acetylene in the torch passages may become ignited and cause a flashback of high pressure gas through the torch in the reverse direction. Such a flashback through the torch may start a high pressure wave traveling back through the gas supply pipe, which may cause disassociation of the pure acetylene, even though the pressure of the gas initially was only ten pounds, which is usually considered safe. As the high pressure wave progresses through the gas supply pipe in the reverse direction to its normal flow, the high pressure of the gas is maintained by the heat of disassociation, and the wave may continue with extreme rapidity, unless interrupted in its passage through the pipeline, until it reaches the gas supply tank or generator where it may ignite the gas and cause a serious and damaging explosion.

In order to eliminate the danger which may result from such conditions, I have devised an improved device, termed a flashback arrester, which, when subjected to a predetermined high pressure, instantly interrupts the reverse flow of gas through the supply line at a point ahead of the explosive wave, whereby the reverse flow of explosive gas is effectively interrupted, and all danger of an explosion occurring at the gas supply source is positively eliminated.

Flashback arresters have heretofore been developed for preventing the occurrence of explosions in the handling of oxygen-acetylene torches and equipment, but these have usually been of the water-seal type, wherein the gas must pass through water in its passage to the torch tip. Flashback arresters of this general type require a constant supply of water to assure that they are always in condition to effectively interrupt or block a reverse flow of high pressure gas through the pipe. When in such condition, such flashback arresters may effectively prevent the reverse flow of high pressure gas through the pipe line to the source of gas supply, caused by a backfire at the torch tip.

In water type flashback arresters, the space above the water is subject to the violent pressure resulting from a flashback explosion, which may burst the flashback container. It is also possible in such a device that the back pressure may force the water from the water seal back through a defective check valve and thereby render the flashback arrester inoperative. There are also known instances where the water in the water seal has been drawn off into the pipe line because of a sudden rush of high pressure gas therethrough. The water seal may also become ineffective to serve its purpose as a result of gradual evaporation of the water into the gas passing through it.

Flashback arresters of the water seal type therefore have not been entirely satisfactory, and it is highly desirable that means be provided for positively preventing or blocking the reverse flow of high pressure gases resulting from a backfire at the torch tip, from reaching the source of gas supply by reverse flow through the gas supply pipe, which may cause serious explosions, as is well known.

An important object of the present invention therefore is to provide a device adapted to be interposed in a conduit utilized for conducting an explosive gas from a supply source to a point of use, which device is adapted to positively prevent a backflow of high pressure gas through the conduit caused from an explosion or backfire of the gas at the discharge end of the conduit, and whereby the backflow of explosive gases cannot reach the source of gas supply and cause an explosion thereof.

A further object is to provide a flashback arrester adapted for use in conjunction with a conduit for conducting a combustible gas from a source of gas supply to a torch tip, adapted to automatically interrupt the flow of gas through the conduit in the event of a sudden abnormal increase in the pressure of the gas, from any cause, and particularly in the event of a backflow of high pressure gas through the conduit caused by a backfire or explosion of the fuel gas at the tip of the torch.

A more specific object of the invention is to provide a flashback arrester adapted to be interposed in a conduit for supplying a combustible gas to a torch which device comprises a spring-actuated valve having trigger means for normally retaining it in open position to permit free gas flow through the valve, and a trigger release being embodied in said device including a pressure responsive element adapted to be actuated by a sudden increase in the pressure of the gas flowing through the device to thereby actuate the trigger, and effect the release of the valve, whereby the spring-actuated valve is instantly moved into closing position to thereby positively interrupt further flow of gas through the device and gas supply conduit.

A further object is to provide a flashback arrester particularly adapted for use in combination with an oxygen-acetylene torch for preventing a backflow of high pressure gas, such as acetylene, through the acetylene supply conduit to the source of supply, which may cause a serious explosion of the gas at the source of supply, said device comprising a spring-actuated valve which normally is retained in open position to permit free gas flow therethrough, and a diaphragm being embodied in said device and having one side operatively connected to a trigger for retaining the valve in open position, and the opposite side of the diaphragm being exposed to the flow of gas through the device, whereby when a flashback occurs at the torch tip and causes a sudden backflow of high pressure gas in the fuel gas supply conduit, said diaphragm is actuated to move the trigger out of locking engagement with the valve, whereupon the valve is automatically moved into closed position to prevent further flow of high pressure gas through the conduit in the direction of the gas supply source, the conduit leading from the diaphragm to the valve being of sufficient length to allow the flash arrester to operate to close the valve before the high pressure gas or explosion can reach the valve after having actuated the diaphragm to operate the trigger and release the valve.

Other objects of the invention reside in the simple and inexpensive construction of the device, the body of which is preferably made of two parts to facilitate construction and assembly; in the specific construction of the trigger means for retaining the valve in open position during normal operation of the torch; in the provision of a simple operating lever to facilitate resetting the trigger means each time it has been released to permit the valve to close; in the provision of a safety device comprising an electrically operated valve which normally is retained in open position by a spring, and having an electric control circuit comprising spaced contacts which normally are in open position and are adapted to be moved into electrical engagement with one another to close the circuit, in the event of a sudden increase in the pressure of the gas flowing through the device, whereupon the valve is instantly moved into closing position to interrupt gas flow through the conduit; in the provision of a safety device of the class described comprising a body having a valve chamber therein which is in communication with the gas supply conduit, and a valve being mounted in said chamber and having means for normally retaining it in open position, and a pressure responsive element also being located in said body and having an operative connection with the valve retaining means, said valve chamber having one end of an elongated conduit in communication therewith for conducting the fuel gas from the valve chamber to said element, said conduit being of sufficient length to allow the valve ample time to close before a backflow of high pressure gas can reach the valve chamber, in the event of an explosion at the torch tip causing a sudden backflow of high pressure gas through said body; and in the provision of a safety device which readily lends itself for use in conjunction with the fuel gas supply conduit of an oxygen-acetylene torch for automatically interrupting the flow of gas through said conduit, in the event of a sudden increase in the pressure of the gas flowing therethrough, regardless of the causes of such increase in pressure.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claim which follows.

Figures 1, 5:
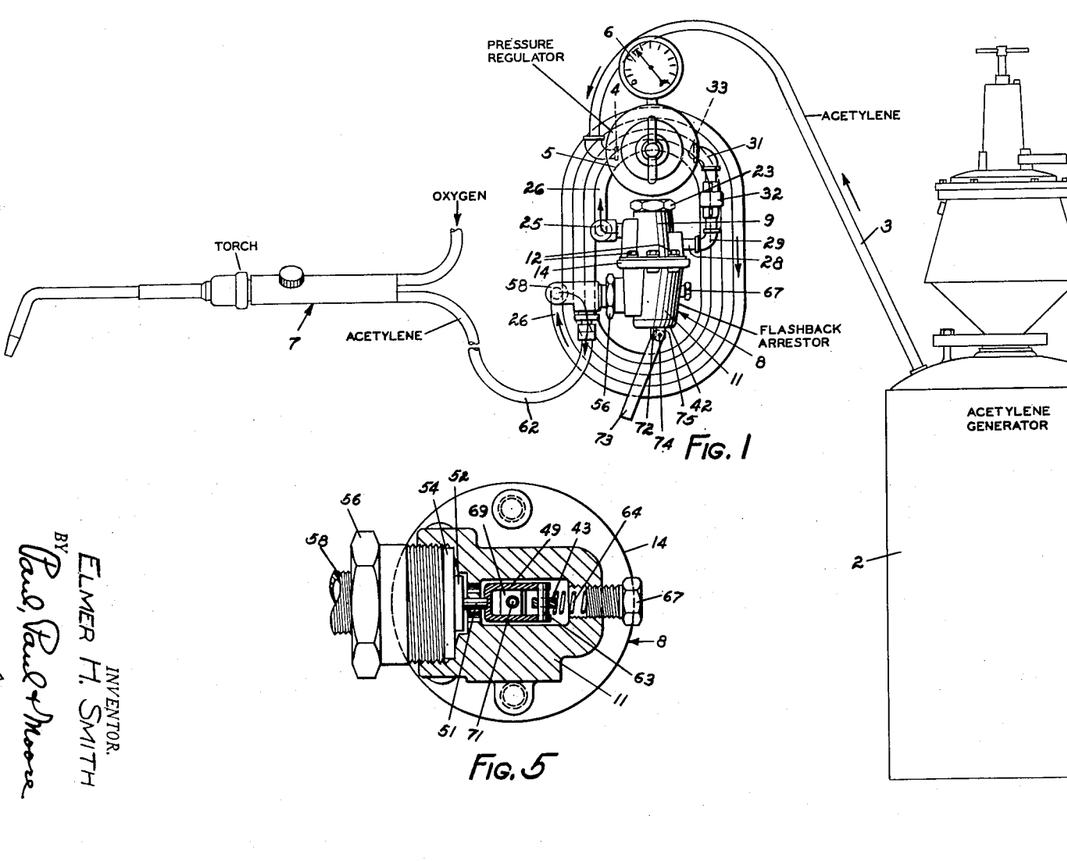
Figure 1 is a diagrammatic view showing the flashback arrester interconnected in the acetylene supply conduit of an oxygen-acetylene torch.
Figure 5 is a sectional plan view on the line 5—5 of Figure 3.

In the selected embodiment of the invention herein disclosed, there is diagrammatically illustrated in Figure 1, a conventional acetylene generator, generally designated by the numeral 2 and having a conduit 3 leading therefrom and connected to the intake 4 of a conventional pressure regulator 5, having a pressure indicating gauge 6 for indicating the pressure of the acetylene or fuel gas flowing through the conduit 3.

The novel safety device herein disclosed is adapted to be interconnected in the conduit 3 between the generator 2 or other gas supply source, and the usual oxygen-acetylene torch, generally designated by the numeral 7.

Figures 2, 6:
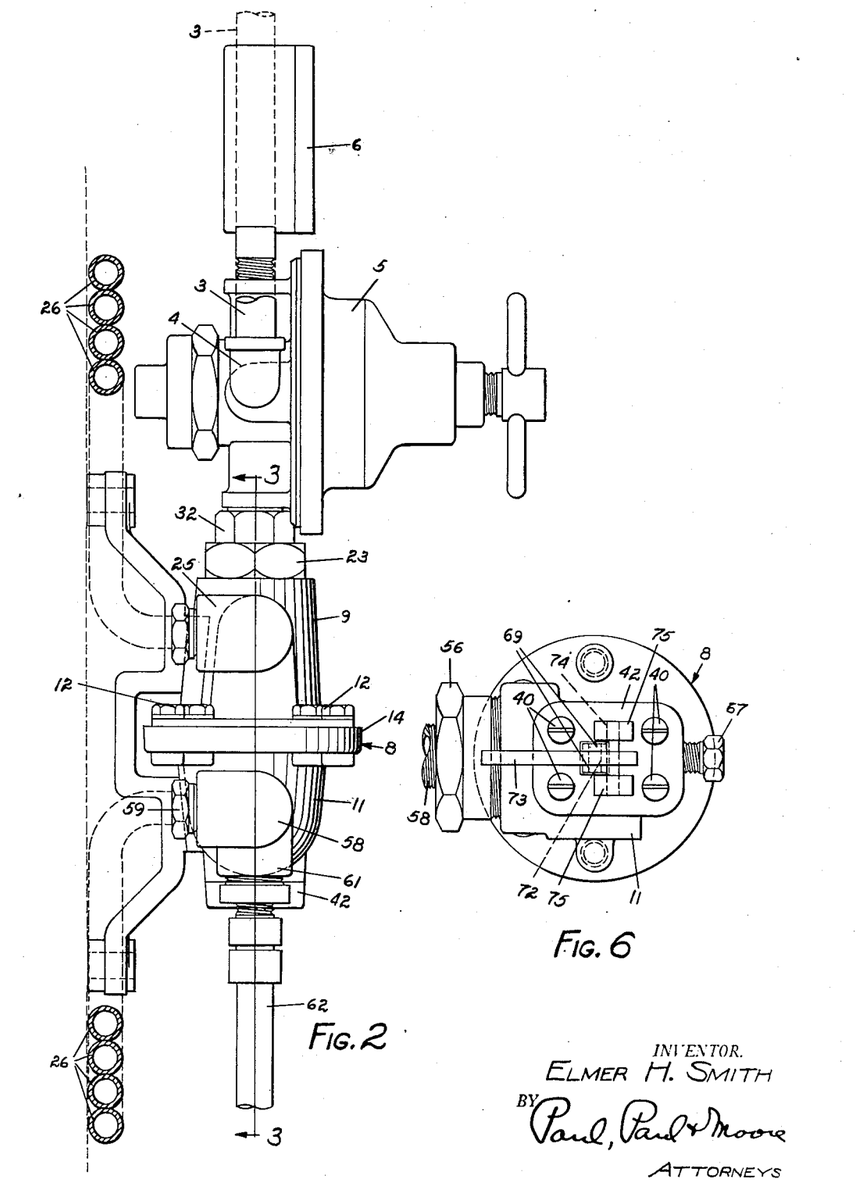
Figure 2 is a side view of an installation similar to the one shown in Figure 1, on an enlarged scale, showing the safety device adapted for wall mounting.
Figure 6 is a bottom view of the flashback arrester.
Figure 3:
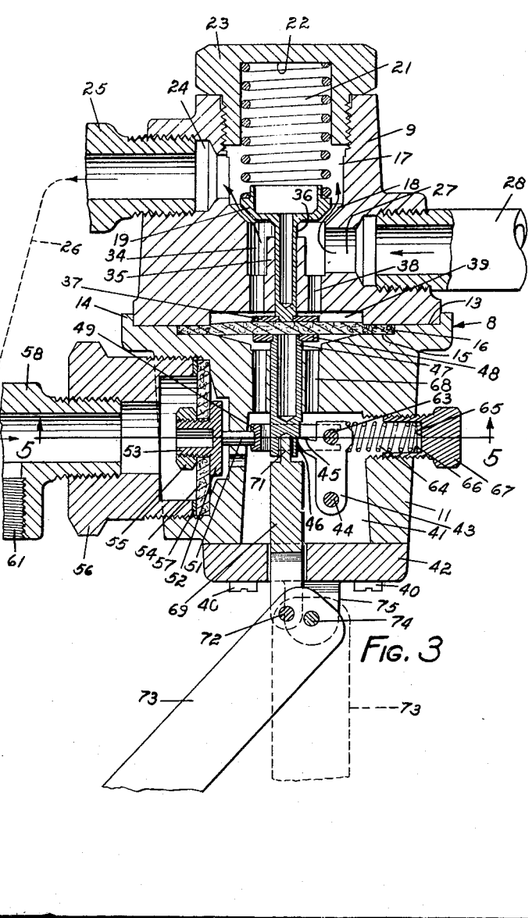
Figure 3 is a vertical sectional view on the line 3—3 of Figure 2, on an enlarged scale, showing the valve in open position and the trigger actuating diaphragm in its normal position.
Figure 4:
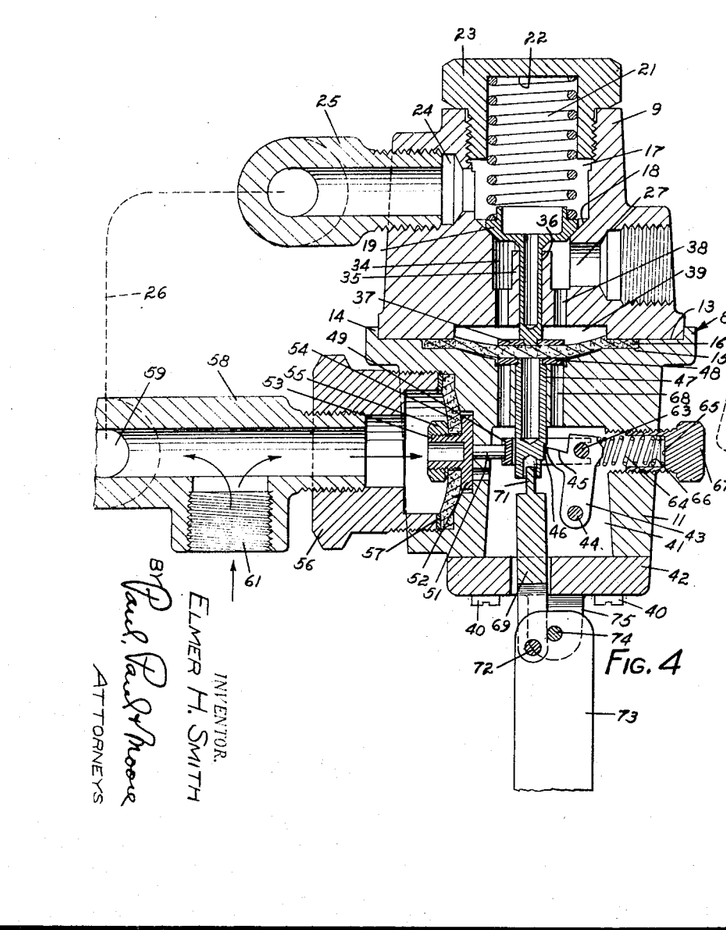
Figure 4 is a view similar to Figure 3, but showing the valve in closed position, as when released by the trigger means as a result of the trigger diaphragm having been actuated by an abnormally high pressure in the fuel gas supply conduit.

The construction of the safety device or flashback arrester is best illustrated in Figures 3 and 4, and comprises a body, generally designated by the numeral 8, comprising upper and lower parts 9 and 11, respectively, bolted together by suitable bolts or screws 12, as shown in Figure 2.

The lower part 11 is provided with a seat 13 shown surrounded by an upright flange 14. The lower part 11 is shown provided with a second seat 15 of slightly smaller diameter than the seat 13, adapted to receive a diaphragm 16, as clearly illustrated in Figures 3 and 4. The diaphragm 16 is slightly thicker than the depth of the seat 15 whereby when the lower end of the upper part 9 is placed upon the seat 13 and is secured thereto by the bolts 12, the marginal edge of the diaphragm 16 will be compressed between the parts 9 and 11 to thereby provide a leak-tight joint between said parts.

A valve chamber 17 is provided in the upper part 9 having a valve seat 18 at its bottom adapted to be engaged by a valve 19. A spring 21 has its lower end engaged with the valve 19 and its upper end is seated against the bottom 22 of a counterbore provided in a nut 23, received in threaded engagement with the upper end of the part 9, as clearly illustrated in the drawings. The spring serves to constantly exert a downward pressure against the valve 19 to move it into closing engagement with its seat 18. The valve chamber 17 has an outlet 24 which is threaded to receive a fitting 25 having one end of a conduit 26 connected thereto, as will be understood by reference to Figures 1 and 2.

The upper part 9 of the body of the device is shown having an intake 27 located directly below the valve 19. The intake is threaded to receive one end of a conduit 28, including fittings 29 and 31 and a union 32. The opposite end of the conduit 28 is connected to the discharge side 33 of the pressure regulator 5. An auxiliary chamber 34 beneath the valve seat 18 is in constant communication with the pressure regulator 5 through the conduit 28, as will be understood by reference to Figures 1 and 3.

The bottom of the chamber 34 is shown provided with an upstanding boss 35 having a bore therein for guidingly receiving a hollow valve stem 36 of the valve 19. A small plate 37 is preferably secured to the bottom of the valve stem 36 and is seated against the upper face of the diaphragm 16 by the compression spring 21 engaged with the valve 19. The spring 21 thus constantly tends to urge the valve and diaphragm into valve closing position, as shown in Figure 4. Suitable vents 38 establish communication between the chamber 34 and the space 39 provided above the diaphragm 16, thereby to prevent the formation of a vacuum in the chamber 34 or space 39, when the diaphragm is actuated.

The lower part 11 of the body of the device is shown provided at its bottom end with a chamber 41, normally closed by a cap 42 having suitable means such as bolts or screws 40, for detachably securing it to the part 11. The chamber 41 houses a trigger mechanism which serves to normally retain the valve 19 in open position.

The trigger mechanism comprises a trigger 43 supported on a suitable pivot 44 anchored in the wall of the chamber 41. The trigger has a laterally extending detent 45 adapted to engage a notch or shoulder 46 provided on a hollow stem 47, slidably supported in a guide bore provided in the part 11 directly below the diaphragm 16, as will be understood by reference to Figures 3 and 4. A circular plate or disk 48 is secured to the upper end of the stem 47 and bears against the bottom face of the diaphragm 16.

A small yoke 49, best shown in Figure 5 straddles the lower end of the stem 47 and has one end of a pin 51 received in a recess provided in the closed end of the yoke. The opposite end of the pin is engaged with a head 52 having a threaded portion 53 received in an aperture provided in a diaphragm 54. A nut 55 secures the head 52 to the diaphragm for direct movement therewith. The diaphragm is supported in the bottom of a threaded socket provided in the lower part 11, and is shown secured in position therein by a nut 56, a suitable gasket 57 being provided between the marginal edge of the diaphragm 54 and the inner end of the nut 56 to provide a sealtight connection between the nut and part 11.

The nut 56 is shown having a threaded aperture adapted to receive one end of a fitting 58 having an intake 59, to which the other end of the conduit 26 is connected, as best shown in Figure 1. An outlet 61 is provided in the fitting 58 to which one end of a fuel supply conduit 62 is connected. The opposite end of conduit 62 is connected, as illustrated in Figure 1. It will thus be noted by reference to Figure 4, that the diaphragm 54 is always exposed to the pressure of the fluid flowing through the fitting 58, regardless of the directional flow of the gases therethrough.

The terminals of the spaced legs of the yoke 49 are shown notched to receive the end portions of a pin 63, received in a transverse aperture provided at the upper end of the trigger 43, whereby the detent 45 of the trigger is always retained in operative relation to the notch 46 in the stem 47, as will be understood by reference to Figures 3 and 4.

A spring 64 has one end seated against the trigger 43 and its opposite end against the bottom 65 of the bore 66 provided in a spring retaining screw or nut 67, received in threaded engagement with a wall of the bore provided in the lower part 11, and whereby the tension of the spring may be conveniently varied by manual manipulation of the spring retaining nut or screw 67, as will be understood. The spring 64 retains the pin 63 against the bottoms of the notches provided in the spaced legs of the yoke 49, and also whereby the opposite end of the yoke is held in contact with the pin 51 as will be understood. Vents 68 are provided in the lower part 11 to establish communication between the chamber 41 and the space provided beneath the diaphragm 16, thereby to permit free movement of the diaphragm without restraint.

Means is provided for manually resetting the trigger 43 in the event that it has been actuated to release the valve 19, as a result of the diaphragm 54 having been distorted from a sudden increase in the pressure of the gas flowing through the fitting 58. Such means is shown comprising a push rod 69 provided at its upper end with a reduced terminal 71 received in a bore provided in the lower end of the stem 47 and whereby the upper end of the push rod is retained in alignment with the stem 47.

The lower end of the push rod 69 is preferably forked and has a pin 72 connecting it to a valve reset lever 73 pivoted at 74 to depending lugs 75 provided on the cap 42. The cap 42 may, if desired, be made in two parts, as it does not require that it be retained in engagement with the lower part 11 by a sealtight joint. The lever 73 is normally positioned as indicated in dotted lines in Figure 3, and when swung to the full line position shown in this figure, the push rod 69 is moved upwardly to thereby impart a similar movement to the stem 47, central portion of the diaphragm 16, valve rod 36, and valve 19, whereby the valve is moved into open position. When the above parts are thus operated, the notch or shoulder 46 adjacent to the lower end of the stem 47 is moved above the detent 45, whereby the spring 64 will cause the detent to move into locking engagement with the shoulder 46 to thereby lock the valve 19 in its open position against the tension of the spring 21.

Under normal operation of the device herein disclosed the fuel gas will flow from the generator or source of supply 2, through the conduit 3, the pressure regulator valve 5, and thence through the conduit 28 into the chamber 34, beneath the valve 19. Because of the valve being open under normal operating conditions, the fuel gas will flow uninterruptedly through the valve chamber 17, and conduit 26, fitting 58, and thence into the conduit 62 which conducts the gas to the torch 7, as indicated in Figure 1.

An important feature in the construction of the flashback arrester herein disclosed resides in the length of the conduit 26, which must be such that in the event of a sudden reverse flow of high pressure gas in the conduit 62, caused possibly by an explosion or backfire of the fuel gas at the tip of the torch, the valve 19, when released, will have ample time to move into closing position before the high pressure gas reaches the valve chamber 17.

In the event of a backfire or explosion of the fuel gas in the torch, causing a backflow of a high pressure gas through the conduit 62, such backflow of high pressure gas will distort the diaphragm 54, as shown in Figure 4, and cause it to move the trigger 43 out of locking engagement with the shoulder 46 of the stem 47, whereupon the valve 19 is instantly moved into closing engagement with the valve seat 18 by the action of the spring 21, to thereby shut off any possible escape of the high pressure gas into the conduit 28 of the valve chamber 17. As hereinbefore stated, the conduit 26 is made amply long to positively prevent any backflow gases entering therein from reaching the valve chamber 17, after the valve has closed.

The trigger operating diaphragm 54 is constantly exposed to the flow of gases through the conduit 26, and the tension of the spring 64 is so adjusted that the spring will hold the diaphragm against distortion under all normal operating pressures. By so adjusting the spring 64, harmless pressure rises in the line which may be caused by normal pressure variations at the gas source and will not actuate the diaphragm to cause it to actuate the trigger and thus unnecessarily release the shutoff valve 19.

It will thus be seen that a backfire or backflow of high pressure gases through the fuel supply conduit 62 cannot reach the generator or gas supply source and cause an explosion at the generator or other gas supply source, with its resultant damages to equipment and possible bodily injury to attendants.

Figure 7:
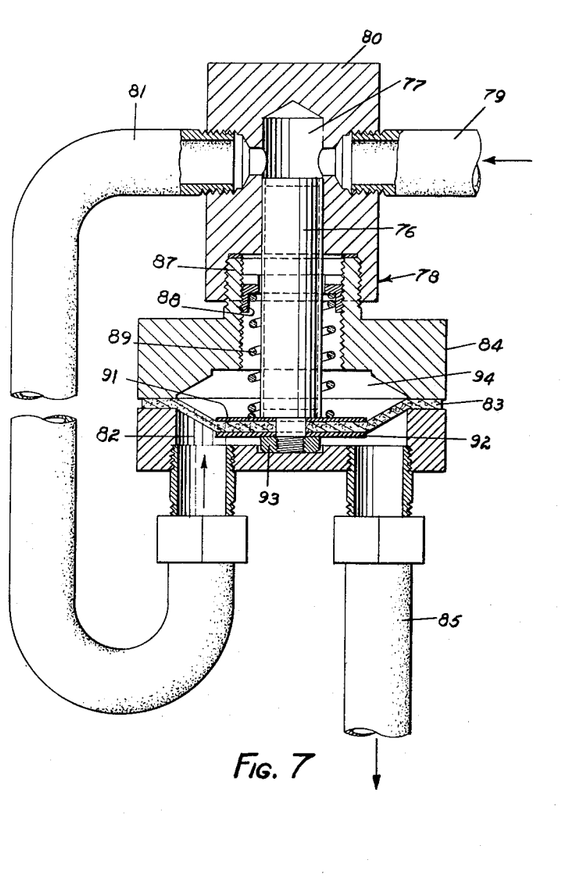
Figure 7 is a view showing a flashback arrester of slightly modified construction, the valve being shown in its normal open position.
Figure 8:
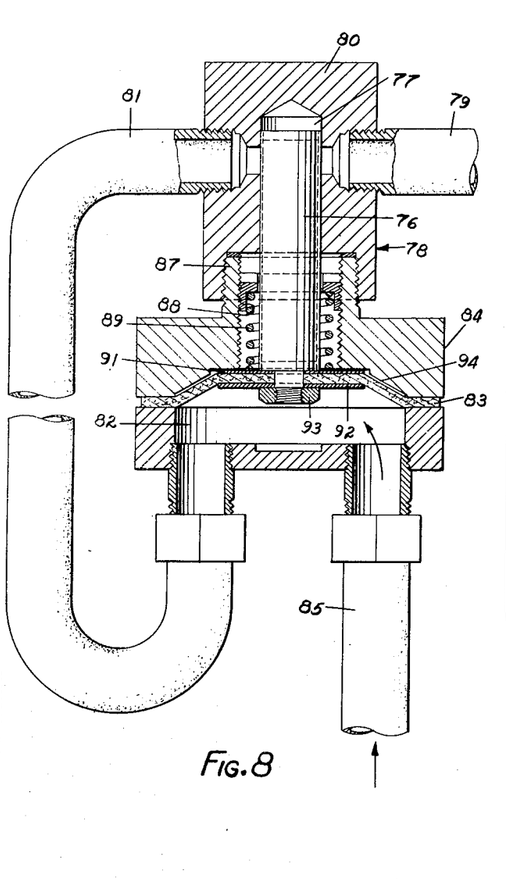
Figure 8 is a view similar to Figure 7, but showing the valve closed as a result of the diaphragm secured thereto having been distorted by a sudden increase in the pressure of the gas flowing through the conduit.

Figures 7 and 8 illustrate a flashback arrester of somewhat different construction, comprising a spring-actuated valve 76 mounted for sliding movement in a bore 77 provided in the upper part 80 of a valve body, generally designated by the numeral 78. The conduit 79 leads from the usual discharge 33 of the pressure regulator 6 and conducts lower pressure fuel gas into the bore 77 of the safety device 78. A conduit 81, corresponding to the conduit 26 of the previous figures, conducts the low pressure fuel gas from the bore 77 into a chamber 82 located beneath a diaphragm 83 provided in the lower part 84 of the composite body 78 of the flashback arrester. A second conduit 85, corresponding to the conduit 62 in Figure 1, leads from the device 78 to the torch 7, as will be understood.

The lower part 84 of the device is shown having a threaded extension 87 at its upper end adapted to be received in threaded engagement with the lower end of the upper part 80. The extension 87 is internally threaded to adjustably receive an abutment member 88 for one end of a spring 89, shown coiled about the valve 76. The lower end of the spring is seated against a plate 91 between which and a second plate or disk 92, the central portion of the diaphragm 83 is clamped by a suitable nut 93. The bottom of the part 84 is made concave as shown in Figure 7, and cooperates with the diaphragm 83 to provide a chamber 94 adapted to receive the diaphragm in the event of a sudden excessive pressure developing in the conduit 81, and adds as a stop to prevent rupture of diaphragm.

In the operation of the safety device shown in Figures 7 and 8, low pressure fuel gas is delivered into the bore 77 from the conduit 79, it being understood that the valve 76 is retained in open position by the action of the spring 89. From the bore 77 the low pressure gas flows through the conduit 81 which, as in Figure 1, is of sufficient length to permit the valve to close in the event of a sudden increase in pressure in the gas flowing through the conduit 81.

Under normal operating conditions the gas flows through the open valve and thence into the chamber 82 beneath the diaphragm 83, and from there into the conduit 85 to the torch or point of use of the gas. The tension in the spring 89 is such that under normal operating conditions, the valve 76 is maintained in open position to permit free flow of low pressure gas through the safety device.

Should an explosion or backfire occur at the tip of the torch causing a sudden backflow of high pressure gas through the pipe 85 and into the chamber 82, such high pressure gas will distort the diaphragm 83 and move it into the position shown in Figure 8, whereby the valve 76 is closed to positively cut off any possible gas flow through the valve bore 77 to the conduit 79.

The valve will remain closed so long as the high pressure exists in the conduits 81 and 85. As soon as the pressure drops to a predetermined figure, the valve is automatically opened to permit normal flow of low pressure gas through the safety device, and therefore normal resumption of the equipment.

Figure 9:
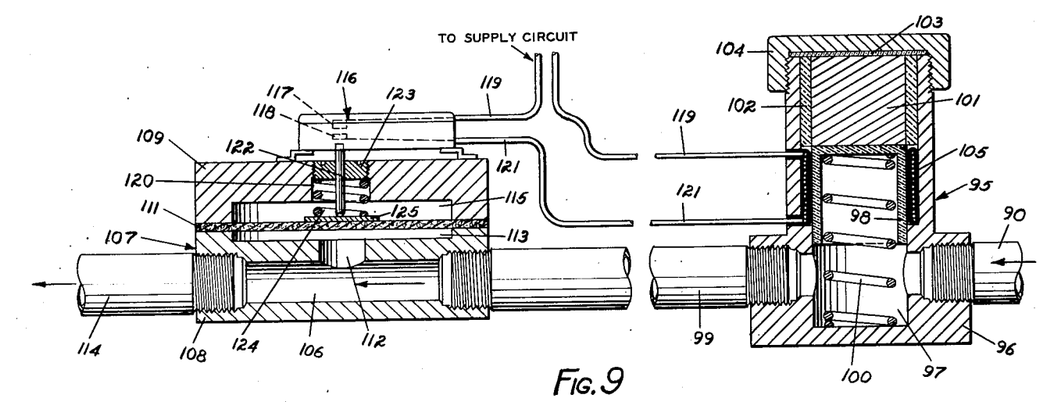
Figure 9 is a view showing a flashback arrester comprising a solenoid-operated valve, the valve being shown in normal open position.
Figure 10:
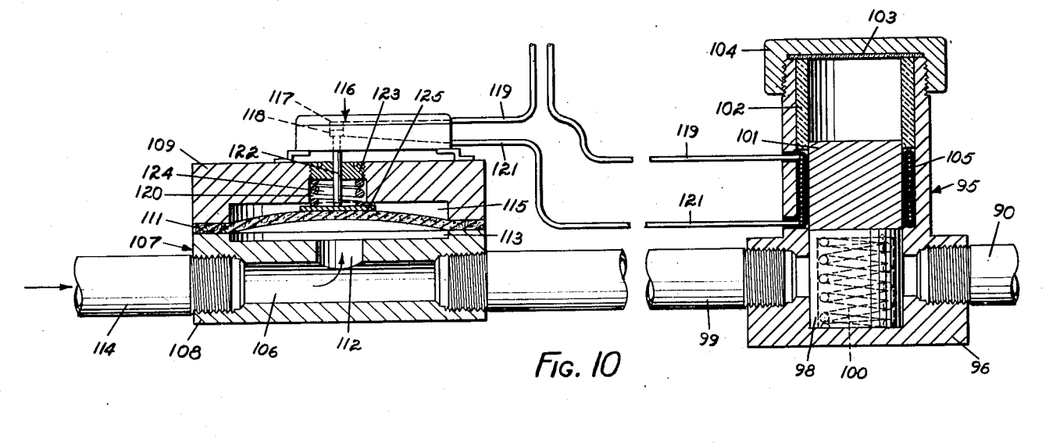
Figure 10 is a view similar to Figure 9, but showing the valve closed as a result of the solenoid control circuit having been closed by a sudden increase in the pressure of the gas flowing through the conduit.

In Figures 9 and 10 there is illustrated an electrically operated safety device which, like the ones shown in the previous figures, has a pressure responsive element or diaphragm, one side of which is constantly exposed to the pressure of the fuel gas flowing through the device to the torch or point of use.

The device comprises a valve body, generally designated by the numeral 95, having a lower portion 96 provided with a valve chamber 97 in which a cup-shaped valve 98 is mounted for sliding movement. One end of the lower portion 96 of the valve body 95, is threaded to receive one end of a conduit 90, corresponding to the conduit 28 of the structure shown in Figure 1, and from which low pressure gas is delivered into the valve chamber 97 from the gas supply conduit 3 of the generator. The opposite end of the lower portion 96 of the body 95 is similarly threaded to receive one end of a conduit 99 corresponding to the conduit 26 of Figure 1 and the conduit 81 of Figure 7.

The valve 98 is preferably bored out, as shown, to receive one end of a suitable spring 100, the opposite end of which is seated in the bottom of the valve chamber 97, as clearly illustrated in Figure 9. The spring 100 normally retains the valve 98 in its open position, as shown in Figure 9. The valve is preferably constructed of a suitable nonferrous metal, and has its upper end secured to a body 101 of a suitable ferrous metal slidable in a sleeve 102 secured in the upper portion of the body 95 by a suitable cap 104. A disk 103, preferably of non-ferrous metal, is shown interposed between the upper end of the body 101 and the cap 104.

A solenoid, generally designated by the numeral 105, comprises a suitable winding which is fixedly secured in position within the body 95 below the sleeve 102. The solenoid coil 105 is made cylindrical in cross-section, and thus cooperates with the sleeve 102 and the wall of the valve chamber 97 to provide an elongated guide for the valve member 98 in its movements into and out of closing positions.

From the body 95 the low pressure gas is conducted by the conduit 99 into a chamber 106 of a second body, generally designated by the numeral 107, composed of lower and upper parts 108 and 109, respectively. A suitable diaphragm 111 is interposed between the parts 108 and 109, and is firmly clamped therebetween by manipulation of suitable bolts or screws, not shown.

An opening 112 establishes communication between the bore 106 and a shallow space 113 provided beneath the diaphragm 111 whereby the major portion of the bottom surface of the diaphragm is exposed to the pressure of the fuel gas flowing through the bore 106 and into a conduit 114 which conducts the fuel gas to the torch or point of use.

The upper part 109 of the device 107 has its bottom face counterbored or recessed to provide a chamber 115 adapted to provide clearance for the diaphragm 111, when distorted, by excessive gas pressure in the bore 106.

A suitable switch, generally designated by the numeral 116 is shown provided with a fixed contact 117 and a movable contact 118, connected respectively to electric wires 119 and 121 which connect the switch 116 to the solenoid coil 105. The wire 119 is shown adapted to be connected to a source of electric energy, not shown.

A small push rod 122 is slidably mounted in a nut 123 received in threaded engagement with the walls of an opening 120 provided in the upper part 109 of the body 107. The nut 123 is axially adjustable in the bore 120 to vary the tension in a spring 124 having one end seated against the nut 123 and having its opposite end seated on a small disk 125 engaged with the diaphragm 111, whereby the spring constantly exerts a downward pressure against the diaphragm to retain it in switch-opening position, as indicated in Figure 9.

Under normal operating conditions, the valve 101 is retained in open position by the spring 100 whereby the fuel gas may flow uninterruptedly from the conduit 90 through the conduit 99, which it is to be understood is of sufficient length to permit the valve time to close before the high pressure gas can reach the valve chamber 97, should an explosion or backfire occur, causing a backflow of the fuel gases through the system. In the event of such a backflow of high pressure gas in the conduit 114 and bore 106, the diaphragm 111 is distorted, as shown in Figure 10, whereby the push rod 122 is actuated to move the movable contact 118 into circuit-closing engagement with the fixed contact 117.

Such closing of the switch 116 will cause the solenoid 105 to become energized and thereby instantly move the valve 98 into its closed position, as shown in Figure 10. So long as the pressure in the conduit 114 and bore 106 remains above normal operating pressure or is relatively greater than the pressure exerted on the diaphragm by the spring 124, the diaphragm will remain in switch closing position, as shown in Figure 10.

It will thus be noted that the novel apparatus herein disclosed provides means for automatically interrupting or preventing any possible backflow of high pressure gases through the conduits 62 and 3 to the source of gas supply. The device operates automatically to temporarily interrupt fluid flow through the apparatus, whenever the pressure of the gas flowing therethrough exceeds a predetermined pressure.

In the form shown in Figures 1 to 6, inclusive, manual manipulation of the lever 73 is required to reset the valve in its open position, following each interruption of gas flow through the device, causing the valve to automatically close. The fact that the valve requires manual resetting may be considered an advantage in that it gives the operator an opportunity to carefully inspect the apparatus following each backfire or explosion of the fuel gases causing a backflow of high pressure gas through the torch and fuel supply conduits.

In the form shown in Figures 7 and 8, the valve 76 automatically returns to its open position when the pressure of the gas diminishes to its normal operating pressure. Such automatic opening of the valve also occurs in the form illustrated in Figures 9 and 10, when the pressure in the valve chamber is reduced to normal.

The novel flash arrestor herein disclosed in its various forms has been found to positively prevent a backflow of high pressure combustible gas in a torch and its fuel gas supply conduit from reaching the source of gas supply and igniting the gas at the source. The flashback arrestor is very compact and may be assembled as a complete unit independent of the other equipment, such as the generator, regulator and torch. It may be mounted on a wall, as indicated in Figure 2, or it may be mounted on any other suitable support either fixed or movable as may be desired. The conduits 3 and 62 are preferably flexible to permit relative movement of the torch and generator. The conduit 26 may be made in the form of a coil, as shown in Figure 1, having one end connected to the outlet fitting 25 of the body 8 of the device, and having its opposite end connected to the intake fitting 58 thereof, whereby the conduit 26 may become, in effect, a component part of the flashback arrester.

It will be apparent to those skilled in the art that I have accomplished at least the principal objects of my invention, and it will also be apparent to those skilled in the art that the embodiments herein described may be variously changed and modified without departing from the spirit of the inventor, and that the invention is capable of uses and has advantages not herein specifically described; hence it will be appreciated that the herein disclosed embodiments are illustrative only, and that my invention is not limited thereto.

I claim as my invention:

A safety device for automatically interrupting a flashback of high pressure gas through the usual fuel gas supply conduit of a conventional oxygen-acetylene torch, said device comprising a hollow body composed of two parts suitably bolted together, a diaphragm interposed between said parts to provide a leaktight connection therebetween, the interior of the upper part of said body having a spring-actuated valve therein for dividing it into two chambers, the chamber below said valve having an intake conduit for conducting low pressure gas from a gas supply source to the valve chamber said valve having an operative connection with said diaphragm, whereby when the diaphragm moves downwardly said valve closes, the other part of said body being hollow and having a threaded socket in a wall thereof, a fitting received in said socket, a diaphragm seated in the bottom of the socket and secured therein by said fitting, said first mentioned diaphragm having a stem extending into the lower part of said body, a trigger pivotally mounted in said lower body part and having a spring constantly urging it into locking engagement with a shoulder on said stem to thereby retain the valve in open position under normal operation of the torch, a second conduit for conducting low pressure gas to said fitting from the chamber above said valve, one side of said second diaphragm being exposed to the low pressure gas flowing through said fitting from the gas supply source, whereby said second diaphragm may be distorted by a sudden backflow of high pressure gas through said fitting caused by an explosion of the fuel gas at the torch tip, whereby the trigger is moved out of locking engagement with said stem to thereby permit the valve to close before the backflow of high pressure gas can reach the valve chamber, thereby positively preventing the backflow of high pressure gases from reaching the gas supply source and causing an explosion therein.

ELMER H. SMITH.

REFERENCES CITED

The following references are of record in the file of this patent:

UNITED STATES PATENTS

| Number | Name | Date |
| --- | --- | --- |
| 2,035,151 | Eches | Mar. 24, 1936 |
| 2,103,118 | Petroe | Dec. 21, 1937 |
| 2,133,124 | Tornow | Oct. 11, 1938 |
| 2,327,055 | McMahon | Aug. 17, 1943 |